(12) United States Patent
Maniloff et al.

(10) Patent No.: US 10,396,891 B2
(45) Date of Patent: *Aug. 27, 2019

(54) CLIENT PROTECTION SWITCH IN OPTICAL PLUGGABLE TRANSCEIVERS ACTIVATED THROUGH FAST ELECTRICAL DATA SQUELCH

(71) Applicant: Ciena Corporation, Hanover, MD (US)

(72) Inventors: Eric Maniloff, Stittsville (CA); Ronald Hoffe, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,828

(22) Filed: Sep. 10, 2018

(65) Prior Publication Data
US 2019/0007132 A1    Jan. 3, 2019

Related U.S. Application Data

(63) Continuation of application No. 15/364,346, filed on Nov. 30, 2016, now Pat. No. 10,097,262.

(51) Int. Cl.
*H04B 10/40* (2013.01)
*H04B 10/032* (2013.01)
*H04Q 11/00* (2006.01)

(52) U.S. Cl.
CPC .......... *H04B 10/032* (2013.01); *H04B 10/40* (2013.01); *H04Q 11/0005* (2013.01); *H04Q 2011/0039* (2013.01); *H04Q 2011/0043* (2013.01)

(58) Field of Classification Search
CPC ... H04B 10/032; H04B 10/40; H04Q 11/0005
See application file for complete search history.

(56) References Cited

U.S. PATENT DOCUMENTS

| 10,097,262 B2* | 10/2018 | Maniloff .............. H04B 10/032 |
|---|---|---|
| 2002/0176131 A1 | 11/2002 | Walters et al. |
| 2006/0050631 A1* | 3/2006 | Koyuncuoglu ........... H04J 3/14 370/217 |
| 2014/0270755 A1 | 9/2014 | Schmitz et al. |
| 2015/0125158 A1 | 5/2015 | El-ahmadi et al. |

(Continued)

OTHER PUBLICATIONS

CFP MSA Hardware Specification, Revision 1.4, Jun. 7, 2010, pp. 1-53.

(Continued)

*Primary Examiner* — Dzung D Tran
(74) *Attorney, Agent, or Firm* — Clements Bernard Walker PLLC; Christopher L. Bernard; Lawrence A. Baratta, Jr.

(57) ABSTRACT

A pluggable optical transceiver includes one or more optical receivers; one or more optical transmitters; and a host interface communicatively coupled electrically to the one or more optical receivers and the one or more optical transmitters and communicatively coupled electrically via a plurality of pins to a host device, wherein, to disable one or more lanes of the one or more transmitters, a fast electrical squelch implemented in less than about 10 ms is utilized to turn off or turn on associated pins for the one or more optical transmitters. The pluggable optical transceiver can be a Quad Small Form-factor Pluggable (QSFP) type module.

20 Claims, 5 Drawing Sheets

(56) References Cited

U.S. PATENT DOCUMENTS

2017/0118547 A1* 4/2017 West .................. G02B 6/43

OTHER PUBLICATIONS

SFF Committee, INF-8438i Specification for QSFP (Quad Small Formfactor Pluggable) Transceiver, Rev 1.0, Nov. 2006, pp. 1-76.
SFF Committee, SFF-8436, Specification for QSFP+ 10 Gbs 4X Pluggable Transceiver, Standardized as EIA-964 at Rev 4.8 dated Oct. 31, 2013, pp. 1-89.
SFF Committee, SFF-8679, Specification for QSFP+ 4X Base Electrical Specification, Rev 1.7 Aug. 12, 2014, pp. 1-31.

* cited by examiner

CLIENT PROTECTION SWITCH IN OPTICAL PLUGGABLE TRANSCEIVERS ACTIVATED THROUGH FAST ELECTRICAL DATA SQUELCH

CROSS-REFERENCE TO RELATED APPLICATION(S)

The present patent/application is a continuation of U.S. patent application Ser. No. 15/364,346, filed Nov. 30, 2016, and entitled "CLIENT PROTECTION SWITCH IN OPTICAL PLUGGABLE TRANSCEIVERS ACTIVATED THROUGH FAST ELECTRICAL DATA SQUELCH," the contents of which are incorporated by reference herein.

FIELD OF THE DISCLOSURE

The present disclosure generally relates to optical networking systems and methods. More particularly, the present disclosure relates to client protection switching in optical pluggable transceivers, such as Quad Small Form-factor Pluggable (QSFP) and variants thereof, 100 G Form-factor Pluggable (CFP) and variants thereof, etc., activated through a fast electrical data squelch.

BACKGROUND OF THE DISCLOSURE

In optical networking, optical interfaces can be realized through optical pluggable transceivers which are defined via Multisource Agreements (MSAs), such as QSFP and variants thereof, CFP and variants thereof, etc. These pluggable transceivers can be used by networking hardware, such as switches, routers, etc., to form protected bi-directional links. For example, pluggable transceivers can be included in a network element to provide protected client-side connectivity. There are various types of client-side optical protection, such as Y-cable protection, Optical 1+1 via an Optical Protection Switch (OPS), etc. Disadvantageously, some MSA transceivers, such as QSFP and variants thereof, lack a transmitter (Tx) disable pin. Specifically, as the size of these transceivers decreases, there is less available space for pins, such as a Tx disable pin. Without such a pin, turning the transceiver Tx on and off is a slow process, e.g. hundreds of milliseconds, which is unacceptable from a time perspective in any protection scheme. Other types of MSAs do define a Tx disable pin, such as SFP+, XFP, and CFP and variants thereof. However, the implementation here does not provide a mechanism to disable/enable individual lanes. For example, the Tx disable pin in CFP would control all lanes which is inflexible for transceivers carrying multiple clients, N×M (e.g., 4×100, 4×25, 10×10, etc.).

There is a need to support fast client-side protection switch in optical pluggable transceivers in a manner fully supported by host devices to the associated specifications.

BRIEF SUMMARY OF THE DISCLOSURE

In an embodiment, a pluggable optical transceiver includes one or more optical receivers; one or more optical transmitters; and a host interface communicatively coupled electrically to the one or more optical receivers and the one or more optical transmitters and communicatively coupled electrically via a plurality of pins to a host device, wherein, to disable the one or more transmitters, a fast electrical squelch implemented in less than about 10 ms is utilized to turn off or turn on associated pins for the one or more optical transmitters. The plurality of pins may not include a transmitter disable pin. The one or more optical transmitters can include a plurality of optical transmitters, and the fast electrical squelch can be implemented on a per lane basis for the plurality of optical transmitters. The pluggable optical transceiver can be a Quad Small Form-factor Pluggable (QSFP) type module. The fast electrical squelch can be caused by the host device to turn off the one or more optical transmitters responsive to a protection switching event. The fast electrical squelch can be caused by the host device to turn on the one or more optical transmitters responsive to removal of the protection switching event. The one or more optical transmitters and the one or more optical receivers can be connected to an Optical Protection Switching (OPS) device.

In another embodiment, a pluggable optical transceiver method includes operating a pluggable optical transceiver including one or more optical receivers and one or more optical transmitters; communicating, via a host interface communicatively coupled to the one or more optical receivers and the one or more optical transmitters, electrical data between the pluggable optical transceiver and a host device, wherein the host device connects to the pluggable optical transceiver via a plurality of pins; and utilizing a fast electrical squelch implemented in less than about 10 ms to turn off or turn on associated pins for the one or more optical transmitters, to disable the one or more transmitters. The plurality of pins may not include a transmitter disable pin. The one or more optical transmitters can include a plurality of optical transmitters, and the fast electrical squelch can be implemented on a per lane basis for the plurality of optical transmitters. The pluggable optical transceiver can be a Quad Small Form-factor Pluggable (QSFP) type module. The fast electrical squelch can be caused by the host device to turn off the one or more optical transmitters responsive to a protection switching event. The fast electrical squelch can be caused by the host device to turn on the one or more optical transmitters responsive to removal of the protection switching event. The one or more optical transmitters and the one or more optical receivers can be connected to an Optical Protection Switching (OPS) device.

In a further embodiment, a host device supporting a pluggable optical transceiver includes circuitry electrically connected to a host edge card connector; the host edge card connector electrically and mechanically connected to a host interface configured to receive the pluggable optical transceiver, wherein host interface includes a plurality of pins which connect to the pluggable optical transceiver, and wherein, to disable the one or more transmitters, a fast electrical squelch implemented in less than about 10 ms from the circuitry is utilized to turn off or turn on associated pins for the one or more optical transmitters. The plurality of pins may not include a transmitter disable pin. The one or more optical transmitters can include a plurality of optical transmitters, and the fast electrical squelch can be implemented on a per lane basis for the plurality of optical transmitters. The pluggable optical transceiver can be a Quad Small Form-factor Pluggable (QSFP) type module. The fast electrical squelch can be caused by the host device to turn off the one or more optical transmitters responsive to a protection switching event. The one or more optical transmitters and the one or more optical receivers can be connected to an Optical Protection Switching (OPS) device.

In an embodiment, a client-side protection method implemented by a network element using a fast electrical squelch with a first optical transceiver and a second optical transceiver includes detecting a protection switching event affecting one or more lanes associated with the first optical transceiver; causing a fast electrical squelch to the affected one or more lanes of the first optical transceiver to provide a Loss of Signal (LOS) thereto; and subsequent to the LOS to the first electrical transceiver, causing removal of a fast electrical squelch from corresponding one or more lanes of the second optical transceiver to enable the corresponding one or more lanes thereon. The fast electrical squelch can be performed in less than 10 ms to either of the first optical transceiver and the second optical transceiver. The first optical transceiver and the second optical transceiver can be communicatively coupled to a host device via a Y-cable device. The first optical transceiver and the second optical transceiver can be communicatively coupled to a host device via an Optical Protection Switching (OPS) device. The first optical transceiver and the second optical transceiver can be compliant to a Quad Small Form-factor Pluggable (QSFP) variant. The fast electrical squelch can be utilized in lieu of commands over an Inter-Integrated Circuit (I2C) in the QSFP variant. The first optical transceiver and the second optical transceiver can be compliant to a 100 G Form-factor Pluggable (CFP) variant. The fast electrical squelch can be utilized in lieu of a transmitter disable pin in the CFP variant.

In another embodiment, a network element using a fast electrical squelch for client-side protection thereon includes a first client optical transceiver; a second client optical transceiver; and one or more line optical transceivers adapted to provide working lines and protect lines for associated lanes from the first client optical transceiver and the second client optical transceiver, wherein the network element is adapted to detect a protection switching event on the one or more line optical transceivers affecting one or more lanes associated with the first client optical transceiver, cause a fast electrical squelch to the affected one or more lanes of the first client optical transceiver to provide a Loss of Signal (LOS) thereto, and, subsequent to the LOS to the first electrical transceiver, cause removal of a fast electrical squelch from corresponding one or more lanes of the second client optical transceiver to enable the corresponding one or more lanes thereon. The fast electrical squelch can be performed in less than 10 ms to either of the first client optical transceiver and the second client optical transceiver. The first client optical transceiver and the second client optical transceiver can be communicatively coupled to a host device via a Y-cable device. The first client optical transceiver and the second client optical transceiver can be communicatively coupled to a host device via an Optical Protection Switching (OPS) device. The first client optical transceiver and the second client optical transceiver can be compliant to a Quad Small Form-factor Pluggable (QSFP) variant. The fast electrical squelch can be utilized in lieu of commands over an Inter-Integrated Circuit (I2C) in the QSFP variant. The first client optical transceiver and the second client optical transceiver can be compliant to a 100 G Form-factor Pluggable (CFP) variant. The fast electrical squelch can be utilized in lieu of a transmitter disable pin in the CFP variant.

In a further embodiment, a pluggable optical transceiver adapted to implement a fast electrical squelch on one or more transmit lanes includes a plurality of receiver optics; a plurality of transmitter optics; and a host interface communicatively coupled electrically to the plurality of receiver optics and the plurality of transmitter optics and coupled electrically via a plurality of pins to a host device; wherein the plurality of pins include a plurality of transmitter data pins, and wherein, responsive to detection by a network element housing the pluggable optical transceiver of a protection switching event affecting one or more active lanes associated with corresponding transmitter data pins, the pluggable optical transceiver is adapted to detect a fast electrical squelch to the corresponding transmitter data pins to provide a Loss of Signal (LOS) thereto and to turn off the corresponding plurality of transmitter optics based thereon. Responsive to detection by the network element housing the pluggable optical transceiver of a protection switching event affecting one or more inactive lanes associated with corresponding transmitter data pins, the pluggable optical transceiver is adapted to detect a fast electrical squelch removal from the corresponding transmitter data pins to provide a data thereto and to turn on the corresponding plurality of transmitter optics based thereon. The pluggable optical transceiver can be compliant to a Quad Small Form-factor Pluggable (QSFP) variant. The pluggable optical transceiver can be compliant to a 100 G Form-factor Pluggable (CFP) variant.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the present disclosure relates to client protection switching in optical pluggable transceivers, such as Quad Small Form-factor Pluggable (QSFP) and variants thereof, 100 G Form-factor Pluggable (CFP) and variants thereof, etc., activated through a fast electrical data squelch. The fast electrical data squelch is used to implement fast client-side protection on pluggable transceivers for individual lanes. The client-side protection can include Y-cable protection, Optical Protection Switch (OPS) protection, etc. The fast electrical data squelch is used to implement a fast turn on and off of client transmitter lanes, e.g., the fast electrical data squelch is applied to turn off a lane while the fast electrical data squelch is removed to turn on a lane. Advantageously, the fast electrical data squelch enables less than 50 ms protection switching (or alternatively 60 ms protection switching with 10 ms to detect and 50 ms to switch, or any other value for protection switching less than 400 ms), a requirement for client-side protection, with the fast electrical data squelch turn on and turn off time less than about 10 ms and preferably less than 5 ms.

Quad Small Form-factor Pluggable (QSFP)

Figure 1:
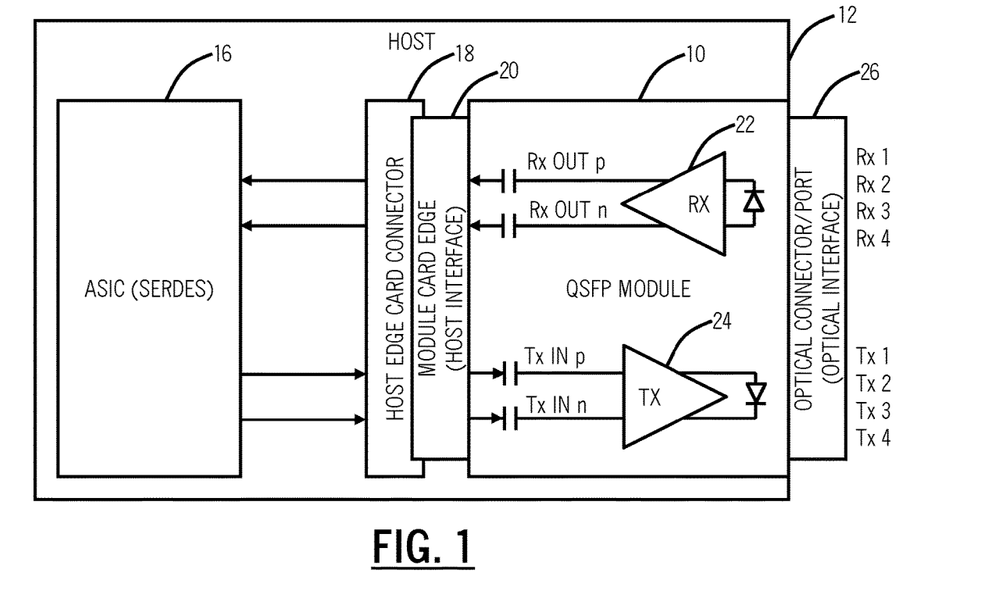
FIG. 1 is a block diagram of a Quad Small Form-factor Pluggable (QSFP) module in a host device.
Figure 2:
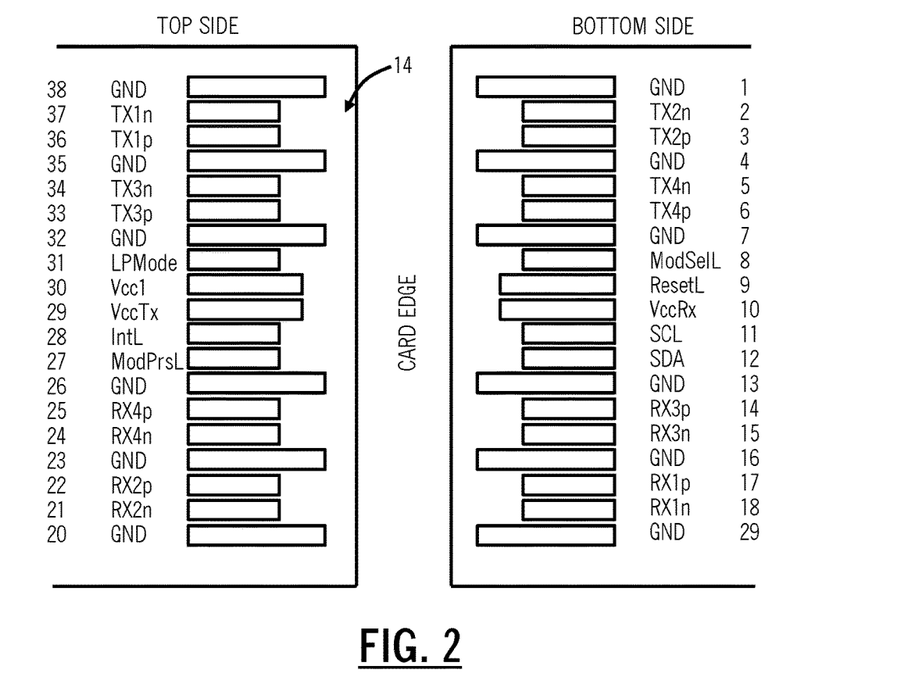
FIG. 2 is a schematic diagram of pins on the QSFP module.

Referring to FIGS. 1 and 2, in an embodiment, a block diagram illustrates a QSFP module 10 in a host device 12 and a schematic diagram illustrates pins 14 on the QSFP module 10. The QSFP module 10 is a compact, hot-pluggable transceiver used for data communications applications. The form factor and electrical interface are specified by a multi-source agreement (MSA) under the auspices of the Small Form Factor (SFF) Committee. The QSFP module 10 interfaces networking hardware to a fiber optic cable or active or passive electrical copper connection. QSFP module 10 is an industry format jointly developed and supported by many network component vendors.

The host device 12 can be a router, switch, or any other type of networking or computing device. The host device 12 can include an Application Specific Integrated Circuity (ASIC) 16 as a Serializer/Deserializer (SERDES) which is electrically connected to a host edge card connector 18. The host edge card connector 18 electrically and mechanically connects to a module card edge 20 which is a host interface. The host edge card connector 18 and the module card edge 20 include electrical connections such as the pins 14. The QSFP module 10 includes one or more receivers 22 which provide a Rx OUT p (p=non-inverted data output) and a Rx OUT n (n=inverted data output) from received optical signal(s) to the host device 12. The QSFP module 10 includes one or more transmitters 24 which receive a Tx IN p (p=non-inverted data input) and a Tx IN n (n=inverted data input) from the host device and output transmit optical signal(s). The QSFP module 10 includes an optical connector/port 26 which provides optical interfaces, such as for four channels (Tx 1, Rx 1, etc.).

The QSFP module 10 is available with a variety of transmitter and receiver types, allowing users to select the appropriate transceiver for each link to provide the required optical reach over the available optical fiber type (e.g., multi-mode fiber or single-mode fiber). The QSFP module 10 is commonly available in several different categories. For example, 4×4 Gbit/s QSFP has four channels carrying Gigabit Ethernet, 4 GFC (Fiber Channel), or DDR Infini-Band. 4×10 Gbit/s QSFP+ is an evolution of QSFP to support four 10 Gbit/sec channels carrying 10 Gigabit Ethernet, 10 GFC Fiber Channel, or QDR InfiniBand. The 4 channels can also be combined into a single 40 Gigabit Ethernet link. 4×14 Gbit/s QSFP+(QSFP14) is designed to carry FDR InfiniBand and SAS-3. 4×28 Gbit/s QSFP+ (QSFP28) is designed to carry 100 Gigabit Ethernet or EDR InfiniBand. This transceiver type is also used with direct-attach breakout cables to adapt a single 100 GbE port to four independent 25 gigabit Ethernet ports (QSFP28-to-4×-SFP28).

The QSFP MSA and variants (QSFP+, QSFP28, etc.) defines electrical interfaces, management interfaces, optical interfaces, mechanical specifications and the like for a providing 40 G and 100 G clients. Specifically, QSFP+ provides four electrical interfaces at 10 G (XLPPI, XLAUI, etc) and four optical interfaces at 10 G. QSFP28 provides 100 G via four 25 G interfaces. QSFP+ is used to carry 40 G traffic (40 G striped across 4 optical lanes running @~10 G each), or 4×10 G services with each fiber carrying an independent 10 G service. For example, the QSFP+ electrical specifications are defined in SFF-8679 "QSFP+4× Base Electrical Specification" Rev. 1.7, August 2014, the contents of which are incorporated by reference.

Again, due to the size of the QSFP module 10, there are a limited number of the pins 14, and as a consequence, the QSFP module 10 (various variants) do not have a Tx disable pin. Additionally, the QSFP module 10 as well as other module types (e.g., CFP) are often used now for multiple data streams, which may need individual protection. Also, QSFP-DD which is the next generation module for 400 GbE, 200 GbE, N×100 GbE also lacks a Tx Disable pin in the pin definitions. Other module types such as microQSFP, QSFP56, OSFP, and the like are under development, and similarly do not include a Tx disable electrical pin. The systems and methods described herein contemplate operation on any type of pluggable optical transceiver with or without a Tx disable electrical pin and with multiple lanes.

To date, Y cable type optical and OPS protection schemes have not been used with QSFP+/QSFP28 modules due to their failure to meet the timing requirements. There are two methods to turn off the Tx in the QSFP module 10: via the control channel which is an Inter-Integrated Circuit (I2C) and via an optical squelch on the electrical Loss of Signal (LOS). Further, the optical squelch can be implemented in two ways: Average power squelch or modulation squelch. Turning off the transmitter through the I2C is too slow to meet the client-side protection requirements (<50 ms) and a squelch on the electrical LOS is specified to be within 400 ms in SFF-8679, again too slow to meet the client-side protection requirement.

100 G Form-factor Pluggable (CFP)

Figure 3:
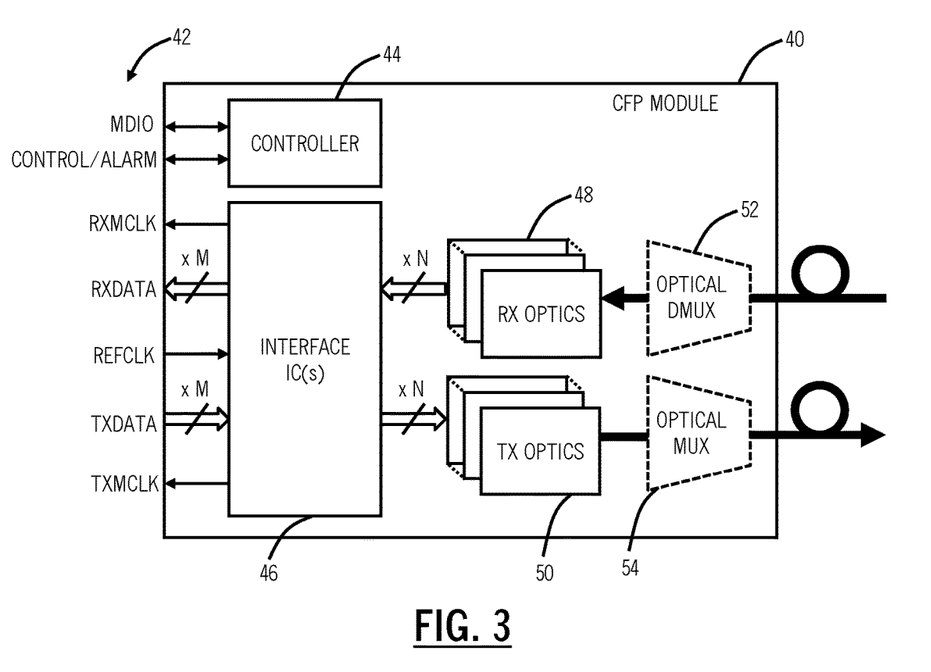
FIG. 3 is a block diagram of a 100 G Form-factor Pluggable (CFP) module.

Referring to FIG. 3, in an embodiment, a block diagram illustrates a CFP module 40. The CFP module 40 is a hot-pluggable optical transceiver form factor enabling 40 Gb/s and 100 Gb/s applications, including next-generation High-Speed Ethernet (40 GbE and 100 GbE). The electrical interface may include a nominal signaling lane rate at 10 Gbit/s per lane with various electrical interface specifications such as CAUI, XLAUI, OTL4.10, OTL3.4, and STL256.4. Other variants of CFP may include CFP2 which uses a signaling lane rates of 10 Gb/s or 25 Gbit/s per lane and CFP4 which uses a signaling lane rate of 25 Gb/s. CFP2 includes options for 10×10 Gb/s electrical signaling (i.e., CAUI) for 100GBASE-SR10, and 4×25 Gb/s electrical signaling (i.e., CAUI-4) for LR4 and ER4 applications. For example, the CFP MSA has an electrical interface of 4×10 G (XLAUI) or 10×10 G (CAUI), the CFP2 MSA has an electrical interface of 4×25 G (CAUI4) or 10×10 G (CPPI or CAUI). Another variant of CFP may include CDFP or CFP8 which uses a signaling lane rate of 25 Gbit/s per lane and has an electrical interface of 16×25 G providing 400 G (400GAUI-16). CFP8 also supports 8×50 G electrical interfaces (400GAUI-8).

The CFP module 40 includes various pins 42 which interface to a host device (not shown in FIG. 3). The pins 42 are categorized as Management Data Input/Output (MDIO, control/alarm, a monitor Rx clock (RXMCLK), receive data (RXDATA), a reference Clock (REFCLK), transmit data (TXDATA), and a monitor Tx Clock (TXMCLK). The CFP module 40 includes a controller 44, interface integrated circuits (ICs) 46, receive optics 48, transmit optics 50, an optical demux 52, and an optical mux 54. The controller 44 interfaces the MDIO and control/alarm pins and the interface integrated circuits 46 interfaces the remaining pins. The RXDATA and the TXDATA have M lanes (pins). The receive optics 48 and the transmit optics 50 can include multiple sets of transceivers, e.g., N, which are combined/split such as using Wavelength Division Multiplexing (WDM) via the demux 52 and the mux 54.

The control/alarm pins for the CFP module 40 include a Tx disable pin which can be used for fast optical protection. However, as specified in the CFP specifications, the Tx disable pin turns off and on all of the transmit optics 50, i.e., all N transmitters. The CFP module 40 does not support individual lanes being turned on and off.

Fast Electrical Squelch

In various embodiments, the systems and methods described herein implement client-side protection on a pluggable optical transceiver (e.g., the QSFP module 10 or variants thereof, the CFP module 40 or variants thereof)

using a fast electrical squelch as an LOS. The fast electrical squelch includes a fast turn off or turn on of electrical signaling on the associated Tx data pins for the QSFP module 10 and the CFP module 40. The fast electrical squelch is implemented in less than 10 ms and preferably less than 5 ms. That is, by "fast," the fast electrical squelch is implemented in less than 10 ms and preferably less than 5 ms. This is considerably faster than the current specifications for QSFP which perform an electrical squelch in 400 ms. Further, the fast electrical squelch is implemented per lane, e.g., Tx 1, Tx 2, Tx 3, Tx 4. By using electrical LOS to implement the Tx off, the systems and methods can both implement client-side protection for bulk interfaces such as 100 GbE in a QSFP28 and implement per lane protection for pluggables supporting multiple interfaces, such as 4×10 GbE in a QSFP+, CFP4, etc. This is of increasing importance as density improvements are planned through having multiple services supported in next generation pluggable modules.

The ability to support a fast electrical squelch is implemented in the QSFP module 10 and the CFP module 40 as well as in the host device 12. Specifically, the host device 12 is configured to provide the fast electrical squelch to turn off or turn on the associated transmitter, such as based on a protection switching event. The QSFP module 10 and the CFP module 40 are also configured to detect the fast electrical squelch and to turn off or turn on the corresponding transmitter. Note, the QSFP module 10 and the CFP module 40 can operate in the host device 12 whether or not the host device 12 supports the fast electrical squelch. Thus, the modification of the QSFP module 10 and the CFP module 40 to support the fast electrical squelch is backward compatible with any host device 12 supporting the associated standards, even if the host device 12 does not support the fast electrical squelch.

Y-cable Optical Protection with Fast Electrical Squelch

Figure 4:
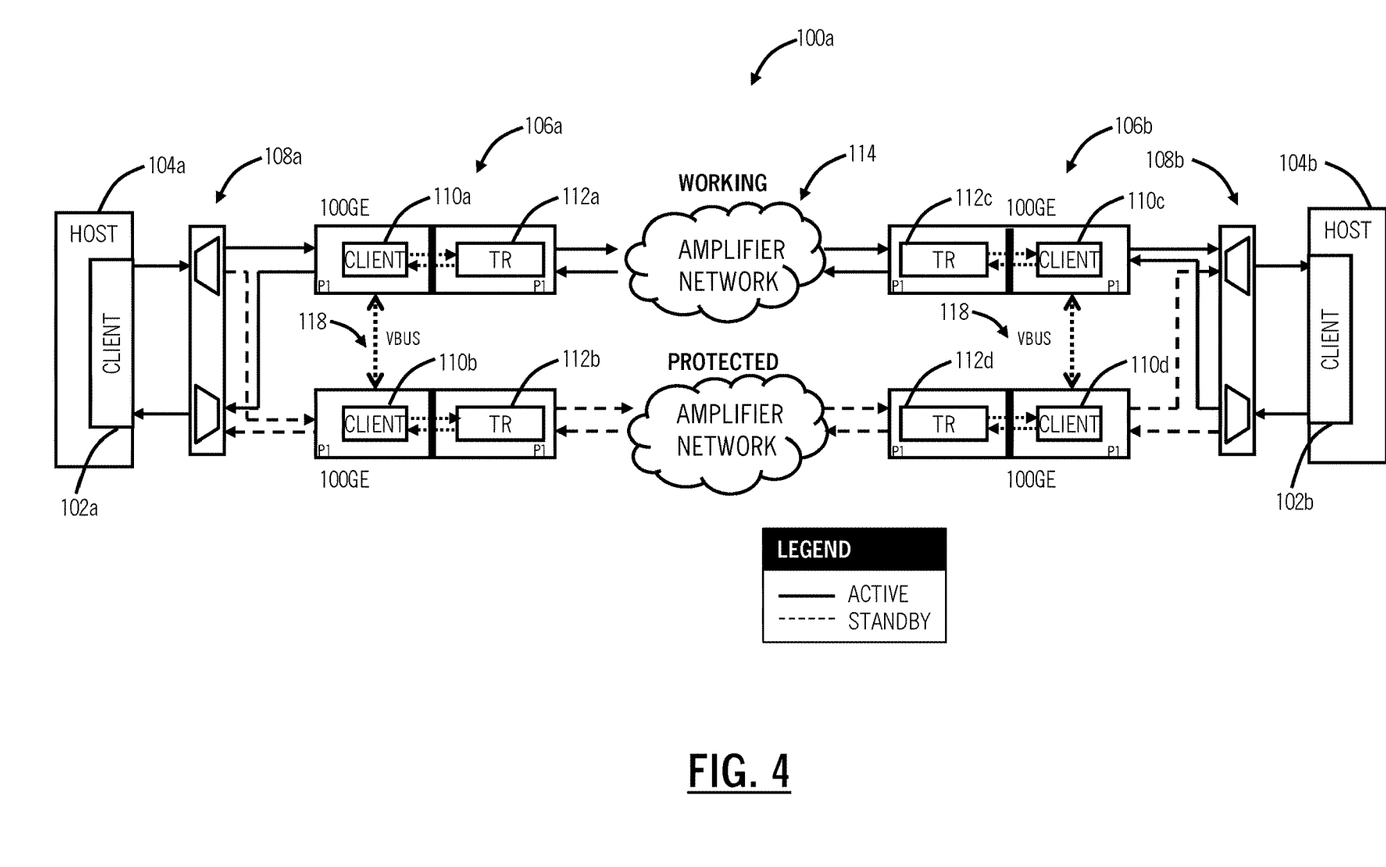
FIG. 4 is a network diagram of a network implementing Y-cable protection.

Referring to FIG. 4, in an embodiment, a network diagram illustrates a network 100a implementing Y-cable protection. Y-cable protection provides line-side protection for a single client interface 102 (labeled as client interfaces 102a, 102b) in a host device 104 (labeled as host devices 104a, 104b). Y-cable protection is referred to as "Y-cable" since a cable between the host device 104 and a WDM network element 106 (labeled as network elements 106a, 106b) includes a single cable fanning out to dual cables. Y-cable protection includes a Y-cable device 108 (labeled as Y-cable device 108a, 108b) which includes a combiner and a splitter. Y-cable protection is also referred to as Transponder Protection Tray (TPT) by Ciena Corporation. The WDM network elements 106a, 106b each can include client interfaces 110 (labeled as client interfaces 110a, 110b, 110c, 110d) and line interfaces 112 (labeled as line interfaces 112a, 112b, 112c, 112d). The line interfaces 112 connect to one another over an optical network 114, providing a working and protected path extending between the client interface 110a to the client interface 110c and between the client interface 110b and the client interface 110d, respectively. Thus, the host device 104 with the client interface 102 has line protection in the optical network 114.

The host device 104 can be a router, switch, or any other type of networking or computing device. The client interface 102 and the client interfaces 110 can be the QSFP module 10, the CFP module 40, etc. Since client-side protection, such as using the Y-cable protection, requires fast switching (e.g., <50 ms), the client interface 102 and the client interfaces 110 are configured to support the fast electrical squelch to turn off and turn on individual lanes on the client interfaces 110, in a fast manner (e.g., <10 ms and preferably <5 ms).

In the example of FIG. 4, the client interface 102 has a single interface which is provided to a Y-cable device 108. The Y-cable device 108a is configured to split an output of the client interface 102a into the client interfaces 110a, 110b and to couple the client interfaces 110a, 110b into a single input to the client interface 102a. That is, the Y-cable device 108a is configured as a splitter directionally from the host device 104a to the network element 106a and as a switch that selects one of the outputs from the network element 106a for the client equipment 104a. The Y-cable device 108b provides similar functionality between the client interface 102b and the client interfaces 110c, 110d. Y-cable protection provides redundancy for client interface equipment as well as the line in the optical network 114. That is, the Y-cable device 108 protects against facility failures and failures in the optical network 114, but the Y-cable device 108 does not protect against failures in the client interface 102. This is an important scheme of protection since failures are more likely in the optical network 114 than in the interface between the host device 102 and the network element 106.

With the Y-cable device 108a, only one of the client interfaces 110a, 110b should be active at any given time. Specifically, the Y-cable device 108a interface a single transmit signal and a single receive signal between the client interface 102a and the client interfaces 110a, 110b. With the conventional approach to turn on and turn off the client interfaces 110a, 110b, it is not possible to switch between the client interfaces 110a, 110b below 50 ms. In fact, using conventional approaches (I2C), the client interfaces 110a, 110b switch in several hundred milliseconds, well above application requirements for Y-cable protection.

With the systems and methods, the network elements 106a, 106b are configured to turn on and turn off individual lanes on the client interfaces 110a, 110b using the fast electrical squelch. The network elements 106a, 106b are configured to detect a protection switching event at the line interfaces 112a, 112b, 112c, 112d. The line interfaces 112a, 112b, 112c, 112d can be WDM transceivers or modems which are configured to detect the protection switching event. The protection switching event can include, without limitation, Loss of Signal (LOS), Alarm Indication Signal (AIS), Loss of Frame (LOF), High Bit Error Rate (BER), manual switch, or the like. That is, the protection switching event can be any event used in WDM to implement a switch between working and protect lines. The WDM network elements 106 can utilize any protocol such as, without limitation, Optical Transport Network (OTN), or the like.

Assume for illustration purposes the working line is active between the client interfaces 110a, 110c and the protect line is inactive between the client interfaces 110b, 110d. The WDM network elements 106a, 106b are configured to detect the protection switching event affecting one or more lanes of the client interfaces 110a, 110c and to correspondingly implement a fast electrical squelch on the affected lanes to turn off the client interfaces 110a, 110c with the protection switching event and to turn the corresponding lanes on the client interfaces 110b, 110d. Note, the fast electrical squelch is performed in a coordinated manner, such as through a bus 118 between the client interfaces 110a, 110b and between the client interfaces 110c, 110d. Specifically, the network element 106a would turn off the client interface 110a and then turn on the client interface 110b, such that neither is active simultaneously to the Y-cable device 108a. With the fast electrical squelch in or below the 5-10 ms range, the turn off and the turn on can be implemented well below 50 ms, supporting the associated protection switching timing requirements.

OPS Optical Protection with Fast Electrical Squelch

Figure 5:
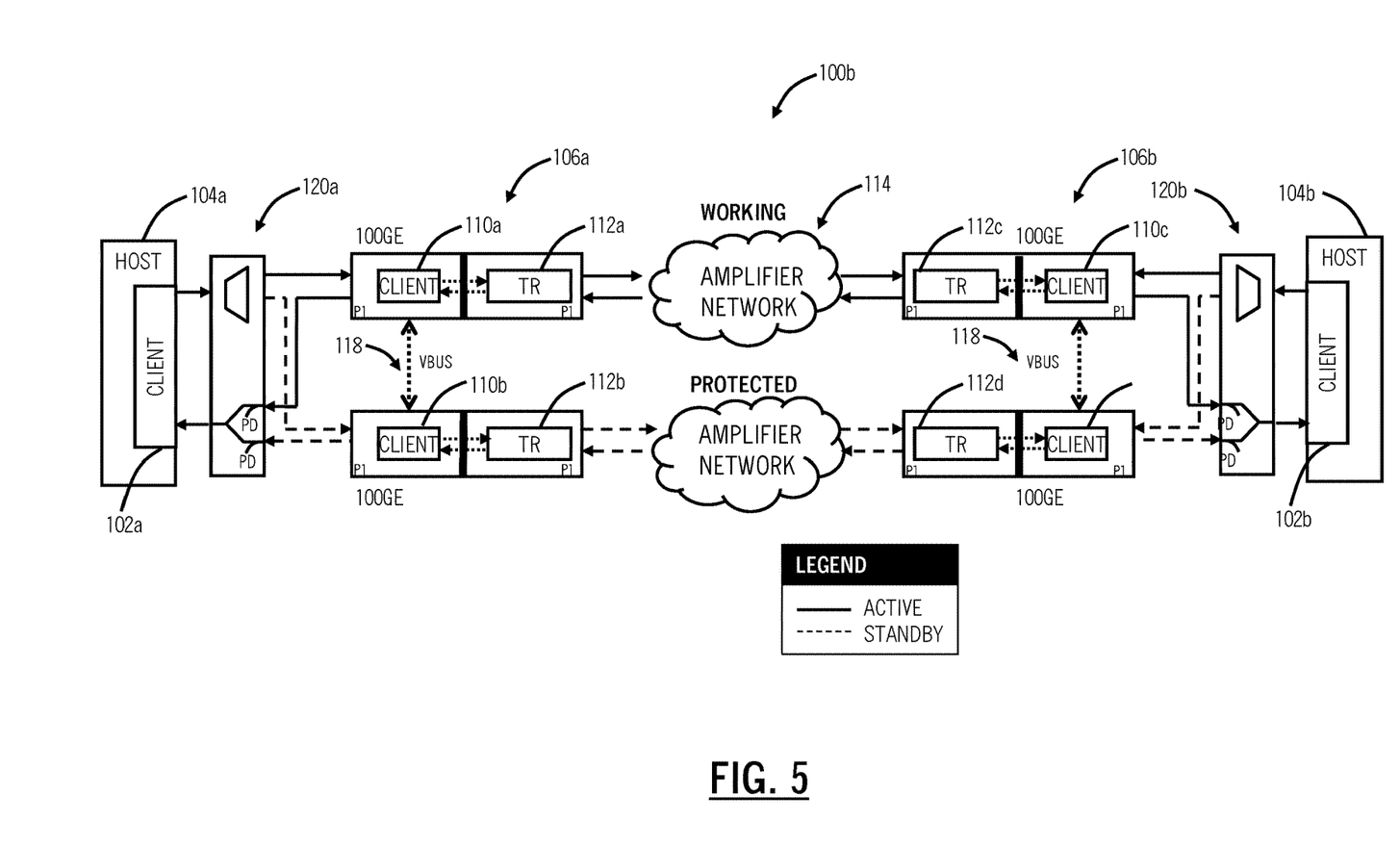
FIG. 5 is a network diagram of a network implementing Optical Protection Switching (OPS) protection.

Referring to FIG. 5, in an embodiment, a network diagram illustrates a network 100b implementing Optical Protection Switching (OPS) protection. The network 100b is similar to the network 100a with the Y-cable device 108a, 108b replaced with an OPS 120 (labeled as OPS 120a, 120b). The Y-cable device 108a, 108b is an all-passive protection switching device which combines and splits signals to the client interface 102 and the network element 106a is responsible for ensuring a single active client interface 110a, 110b. The OPS 120, on the other hand, performs active switching. The OPS 120 on the transmit side (110a &110b ingress direction) includes a splitter which splits the input transmit signal to two directions, e.g., between the client interface 102a to the client interfaces 110a, 110b. On the receive side (110a &110b egress direction), the OPS 120 includes an active 1×2 switch which monitors inputs, such as via a Photodetector (PD), and maintains the switch based on the monitored inputs. For example, the monitored inputs can be based on power thresholds, BER, etc. In this manner, the client interface 102a always transmits to both of the client interfaces 110a, 110b, but only receives an input from one of the client interfaces 110a, 110b based on the current configuration of the switch in the OPS 120.

Individual Lane Fast Electrical Squelch

The optical network 114 is moving towards decoupling optical channels (wavelengths) from logical channels, such as in ITU-T Recommendation G.709 "Interfaces for the optical transport network" (06/2016), the contents of which are incorporated by reference, which describes the use of multiple optical carriers for a single digital transport interface in line side applications, such as an Optical Transport Unit-Cn (OTUCn) which is carried via multiple Optical Tributary Signal (OTSi) carriers (lambdas). Thus, there is no longer necessarily a correlation in the optical network 114 between the data from the client interfaces 110 and a protection switching event may not affect all of the lanes on the client interfaces 110. In this manner, the systems and methods can provide LOS to individual lanes as opposed to all lanes simultaneously as is the case in convention CFPs and the like with a single Tx disable pin. This individual lane approach can be used in any pluggable transceiver including QSFP, CFP, etc.

Client-side Protection Process Using Fast Electrical Squelch

Figure 6:
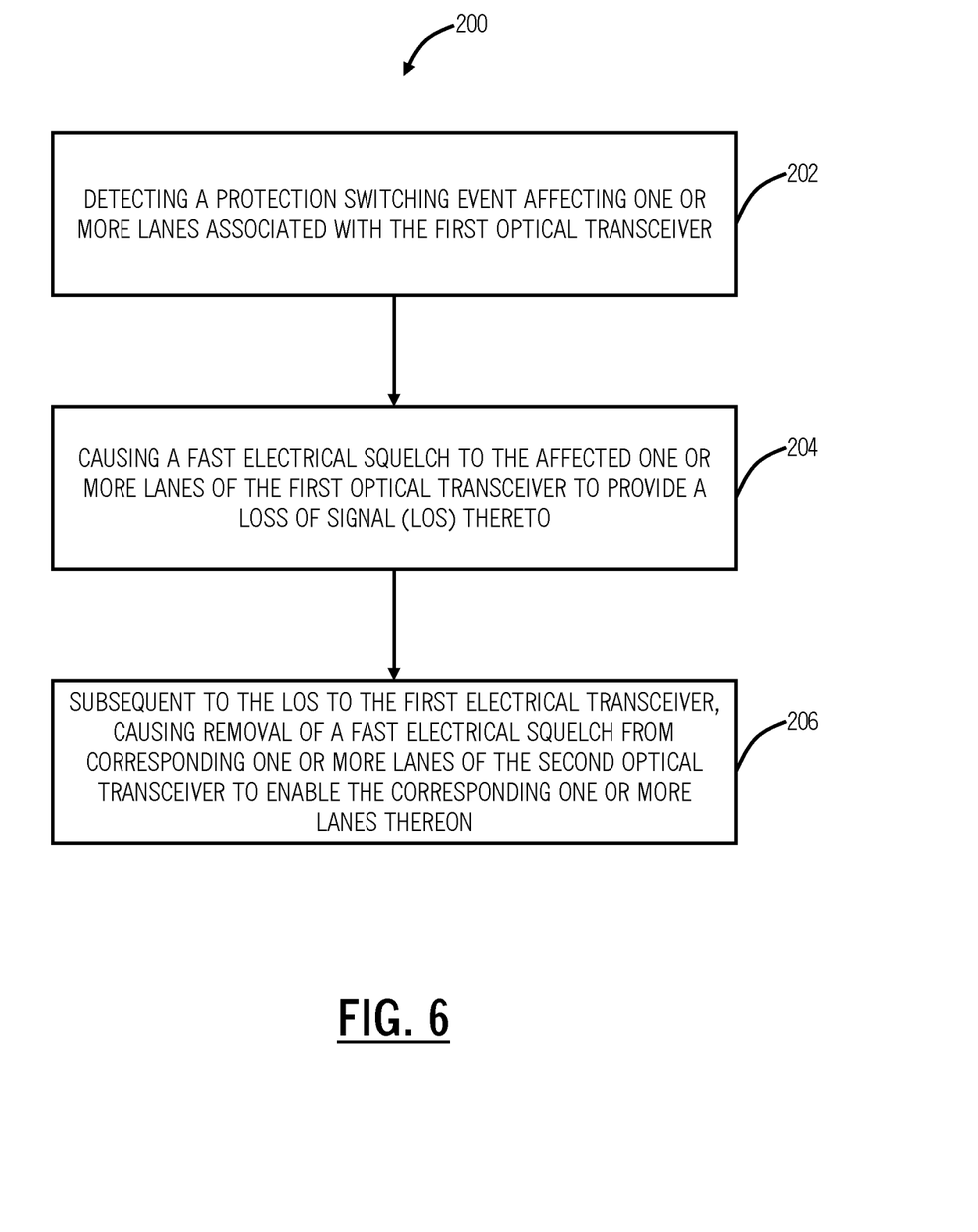
FIG. 6 is a flowchart of a client-side protection process using a fast electrical squelch.

Referring to FIG. 6, in an embodiment, a flowchart illustrates a client-side protection process 200 using a fast electrical squelch. The client-side protection process 200 can be implemented by a network element, such as the network element 106 in the networks 100a, 100b. The client-side protection process 200 includes detecting a protection switching event affecting one or more lanes associated with the first optical transceiver (step 202); causing a fast electrical squelch to the affected one or more lanes of the first optical transceiver to provide a Loss of Signal (LOS) thereto (step 204); and, subsequent to the LOS to the first electrical transceiver, causing removal of a fast electrical squelch from corresponding one or more lanes of the second optical transceiver to enable the corresponding one or more lanes thereon (step 206). The fast electrical squelch can be performed in less than 10 ms to either of the first optical transceiver and the second optical transceiver.

Optionally, the first optical transceiver and the second optical transceiver can be communicatively coupled to a host device via a Y-cable device. Alternatively, the first optical transceiver and the second optical transceiver can be communicatively coupled to a host device via an Optical Protection Switching (OPS) device. The first optical transceiver and the second optical transceiver can be compliant to a Quad Small Form-factor Pluggable (QSFP) variant. The fast electrical squelch can be utilized in lieu of commands over an Inter-Integrated Circuit (I2C) in the QSFP variant. The first optical transceiver and the second optical transceiver can be compliant to a 100 G Form-factor Pluggable (CFP) variant. The fast electrical squelch can be utilized in lieu of a transmitter disable pin in the CFP variant.

In another embodiment, a network element using a fast electrical squelch for client-side protection thereon includes a first client optical transceiver; a second client optical transceiver; and one or more line optical transceivers adapted to provide working lines and protect lines for associated lanes from the first client optical transceiver and the second client optical transceiver, wherein the network element is adapted to detect a protection switching event on the one or more line optical transceivers affecting one or more lanes associated with the first client optical transceiver, cause a fast electrical squelch to the affected one or more lanes of the first client optical transceiver to provide a Loss of Signal (LOS) thereto, and, subsequent to the LOS to the first electrical transceiver, cause removal of a fast electrical squelch from corresponding one or more lanes of the second client optical transceiver to enable the corresponding one or more lanes thereon.

In a further embodiment, a pluggable optical transceiver adapted to implement a fast electrical squelch on one or more transmit lanes includes a plurality of receiver optics; a plurality of transmitter optics; and a host interface communicatively coupled electrically to the plurality of receiver optics and the plurality of transmitter optics and coupled electrically via a plurality of pins to a host device; wherein the plurality of pins include a plurality of transmitter data pins, and wherein, responsive to detection by a network element housing the pluggable optical transceiver of a protection switching event affecting one or more active lanes associated with corresponding transmitter data pins, detecting a fast electrical squelch to the corresponding transmitter data pins to provide a Loss of Signal (LOS) thereto and to turn off the corresponding plurality of transmitter optics based thereon. Responsive to detection by the network element housing the pluggable optical transceiver of a protection switching event affecting one or more inactive lanes associated with corresponding transmitter data pins, detecting a fast electrical squelch removal from the corresponding transmitter data pins to provide a data thereto and to turn on the corresponding plurality of transmitter optics based thereon.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A pluggable optical transceiver comprising:
   one or more optical receivers;
   one or more optical transmitters; and
   a host interface communicatively coupled electrically to the one or more optical receivers and the one or more optical transmitters and communicatively coupled electrically via a plurality of pins to a host device,
   wherein, to disable one or more lanes of the one or more optical transmitters, a fast electrical squelch implemented in less than about 10 ms is utilized to turn off or turn on associated pins for the one or more optical transmitters.

2. The pluggable optical transceiver of claim 1, wherein the plurality of pins does not include a transmitter disable pin.

3. The pluggable optical transceiver of claim 1, wherein the one or more optical transmitters comprise a plurality of optical transmitters, and wherein the fast electrical squelch is implemented on a per lane basis for the plurality of optical transmitters.

4. The pluggable optical transceiver of claim 1, wherein the pluggable optical transceiver is a Quad Small Form-factor Pluggable (QSFP) type module.

5. The pluggable optical transceiver of claim 1, wherein the fast electrical squelch is caused by the host device to turn off the one or more optical transmitters responsive to a protection switching event.

6. The pluggable optical transceiver of claim 5, wherein the fast electrical squelch is caused by the host device to turn on the one or more optical transmitters responsive to removal of the protection switching event.

7. The pluggable optical transceiver of claim 1, wherein the one or more optical transmitters and the one or more optical receivers are connected to an Optical Protection Switching (OPS) device.

8. A pluggable optical transceiver method comprising:
   operating a pluggable optical transceiver comprising one or more optical receivers and one or more optical transmitters;
   communicating, via a host interface communicatively coupled to the one or more optical receivers and the one or more optical transmitters, electrical data between the pluggable optical transceiver and a host device, wherein the host device connects to the pluggable optical transceiver via a plurality of pins; and
   utilizing a fast electrical squelch implemented in less than about 10 ms to turn off or turn on associated pins for one or more lanes of the one or more optical transmitters, to disable the one or more optical transmitters.

9. The pluggable optical transceiver method of claim 8, wherein the plurality of pins does not include a transmitter disable pin.

10. The pluggable optical transceiver method of claim 8, wherein the one or more optical transmitters comprise a plurality of optical transmitters, and wherein the fast electrical squelch is implemented on a per lane basis for the plurality of optical transmitters.

11. The pluggable optical transceiver method of claim 8, wherein the pluggable optical transceiver is a Quad Small Form-factor Pluggable (QSFP) type module.

12. The pluggable optical transceiver method of claim 8, wherein the fast electrical squelch is caused by the host device to turn off the one or more optical transmitters responsive to a protection switching event.

13. The pluggable optical transceiver method of claim 12, wherein the fast electrical squelch is caused by the host device to turn on the one or more optical transmitters responsive to removal of the protection switching event.

14. The pluggable optical transceiver method of claim 8, wherein the one or more optical transmitters and the one or more optical receivers are connected to an Optical Protection Switching (OPS) device.

15. A host device supporting a pluggable optical transceiver comprising:
   circuitry electrically connected to a host edge card connector;
   the host edge card connector electrically and mechanically connected to a host interface, the host edge card connector is configured to receive the pluggable optical transceiver, wherein the host interface comprises a plurality of pins which connect to the host edge card connector, and
   wherein, to disable one or more lanes of one or more transmitters of the pluggable optical transceiver, a fast electrical squelch implemented in less than about 10 ms from the circuitry is utilized to turn off or turn on associated pins for the one or more optical transmitters.

16. The host device of claim 15, wherein the fast electrical squelch is implemented in less than 10 ms.

17. The host device of claim 15, wherein the one or more optical transmitters comprise a plurality of optical transmitters, and wherein the fast electrical squelch is implemented on a per lane basis for the plurality of optical transmitters.

18. The host device of claim 15, wherein the pluggable optical transceiver is a Quad Small Form-factor Pluggable (QSFP) type module.

19. The host device of claim 15, wherein the fast electrical squelch is caused by the host device to turn off the one or more optical transmitters responsive to a protection switching event.

20. The host device of claim 15, wherein the one or more optical transmitters and one or more optical receivers are connected to an Optical Protection Switching (OPS) device.

* * * * *